(12) United States Patent
Aoyama

(10) Patent No.: US 8,006,797 B2
(45) Date of Patent: Aug. 30, 2011

(54) SIDE COLLISION DETECTING APPARATUS FOR VEHICLE

(75) Inventor: Seiki Aoyama, Toyohashi (JP)

(73) Assignee: DENSO CORPORATION, Kariya (JP)

( * ) Notice: Subject to any disclaimer, the term of this patent is extended or adjusted under 35 U.S.C. 154(b) by 94 days.

(21) Appl. No.: 12/457,601

(22) Filed: Jun. 16, 2009

(65) Prior Publication Data

US 2009/0308166 A1     Dec. 17, 2009

(30) Foreign Application Priority Data

Jun. 17, 2008    (JP) .................................. 2008-157846

(51) Int. Cl.
*B60K 28/10*  (2006.01)
*B60T 7/22*   (2006.01)
(52) U.S. Cl. ........................................ 180/274; 280/735
(58) Field of Classification Search ........................ None
See application file for complete search history.

(56) References Cited

U.S. PATENT DOCUMENTS

| | | | |
|---|---|---|---|
| 5,974,892 A | 11/1999 | Swart et al. | |
| 7,331,238 B2 | 2/2008 | Wanami et al. | |
| 7,690,679 B2 * | 4/2010 | Wanami et al. | 280/735 |
| 7,711,467 B2 * | 5/2010 | Nonaka et al. | 701/45 |
| 2006/0176161 A1 | 8/2006 | Bonitz | |
| 2006/0244245 A1 * | 11/2006 | Nonaka et al. | 280/735 |
| 2006/0266101 A1 * | 11/2006 | Takehara et al. | 73/12.09 |
| 2007/0045027 A1 * | 3/2007 | Nonaka et al. | 180/274 |
| 2007/0084663 A1 * | 4/2007 | Wanami et al. | 180/274 |

FOREIGN PATENT DOCUMENTS

| | | |
|---|---|---|
| JP | A-05-155310 | 6/1993 |
| JP | A-07-047915 | 2/1995 |
| JP | A-2006-082278 | 3/2006 |
| JP | A-2007-232566 | 9/2007 |

OTHER PUBLICATIONS

Hosokawa, et al., "Study of New Side Impact Test", Nagoya University (Jul. 25, 2005), pp. 61-66 (English translation of the summary enclosed).
Notice of Reasons for Refusal mailed on May 18, 2010 issued from the Japanese Patent Office in the corresponding Japanese patent application No. 2008-157846 (and English translation).

* cited by examiner

*Primary Examiner* — Andre J Allen
(74) *Attorney, Agent, or Firm* — Posz Law Group, PLC

(57) ABSTRACT

A side collision detecting apparatus includes a pressure sensor disposed in a side door of a vehicle and including a diaphragm for detecting a pressure in the side door. The diaphragm has a pressure receiving surface configured to be distorted in accordance with a change in the pressure. The pressure sensor is arranged so as to satisfy one of a first condition where an angle between a line along which the pressure receiving surface extends and a horizontal line extending in a front-rear direction of the vehicle is from 60 degrees to 90 degrees and a second condition where the angle is less than 60 degrees or greater than 90 degrees and the pressure receiving surface is not vertical.

6 Claims, 12 Drawing Sheets

SIDE COLLISION DETECTING APPARATUS FOR VEHICLE

CROSS REFERENCE TO RELATED APPLICATIONS

The present application is based on and claims priority to Japanese Patent Application No. 2008-157846 filed on Jun. 17, 2008, the contents of which are incorporated in their entirety herein by reference.

BACKGROUND OF THE INVENTION

1. Field of the Invention

The present invention relates to a side collision detecting apparatus for a vehicle.

2. Description of the Related Art

Conventionally, a side collision detecting apparatus for a vehicle detects a side collision by using a pressure sensor as described, for example, in JP-A-2007-232566. The pressure sensor is disposed in a side door of the vehicle. When an object collides against a side surface of the vehicle, the pressure sensor detects a change in a pressure in the side door, and thereby the side collision detecting apparatus detects the side collision of the object. If the side collision detecting apparatus detects that the object collides against the side surface of the vehicle, the side collision detecting apparatus outputs a signal to a side airbag system so that a side airbag inflates for protecting an occupant.

As a pressure sensor of a side collision detecting apparatus, a diaphragm pressure sensor can be used. When a diaphragm of the diaphragm pressure sensor is applied with a pressure, the diaphragm is distorted in accordance with the pressure. Thus, the side collision detecting apparatus detects a distortion of the diaphragm due to a change in the pressure for detecting a side collision. The diaphragm may be distorted due to an impact force of a side collision depending on an arranging direction of the pressure sensor. If a distortion of the diaphragm occurs due to an impact force in addition to a change in the pressure in the side door, it is difficult for the pressure sensor to detect the change in the pressure with accuracy. Thus, the side airbag may inflate even in a minor accident for which an inflation of the side airbag is unnecessary.

Since the diaphragm has a mass, it is inevitable that the diaphragm pressure sensor detects an impact force applied to the diaphragm as a change in the pressure. Especially, in a case where the diaphragm is configured by a semiconductor diaphragm including a piezoresistive element and the diaphragm is covered with a resin gel layer for protecting bonding wires, when the diaphragm is applied with an impact force, a mass of the resin gel layer may have a great influence to the distortion of the diaphragm.

SUMMARY OF THE INVENTION

In view of the foregoing problems, it is an object of the present invention to provide a side collision detecting apparatus that can detect a change in a pressure in a side door with accuracy.

A side collision detecting apparatus according to a first aspect of the present invention includes a pressure sensor disposed in a side door of a vehicle and including a diaphragm configured to detect a pressure in the side door. The diaphragm has a pressure receiving surface configured to be distorted in accordance with a change in the pressure in the side door. The pressure sensor is arranged so as to satisfy one of a first condition where an angle between a line along which the pressure receiving surface extends and a horizontal line extending in a front-rear direction of the vehicle is from 60 degrees to 90 degrees and a second condition where the angle between the line along which the pressure receiving surface extends and the horizontal line extending in the front-rear direction of the vehicle is less than 60 degrees or greater than 90 degrees and the pressure receiving surface is not vertical.

When the pressure sensor is arranged in the side door in the above-described manner, a distortion of the pressure receiving surface of the diaphragm due to an impact force of a side collision can be reduced. Thus, the side collision detecting apparatus can detect the change in the pressure in the side door with accuracy.

A side collision detecting apparatus according to a second aspect of the present invention includes a pressure sensor disposed in a side door of a vehicle and including a diaphragm configured to detect a pressure in the side door. The diaphragm has a pressure receiving surface configured to be distorted in accordance with a change in the pressure in the side door. The pressure sensor is arranged in such a manner that an offset of the pressure receiving surface with respect to a horizontal line inclined at 75 degrees from a line extending in a front-rear direction of the vehicle is within 45 degrees.

When the pressure sensor is arranged in the side door in the above-described manner, a distortion of the pressure receiving surface of the diaphragm due to an impact force of a side collision can be reduced. Thus, the side collision detecting apparatus can detect the change in the pressure in the side door with accuracy.

A side collision detecting apparatus according to a third aspect of the present invention includes a pressure sensor disposed in a side door of the vehicle and including a diaphragm configured to detect a pressure in the side door. The diaphragm has a pressure receiving surface configured to be distorted in accordance with a change in the pressure in the side door. The pressure sensor is arranged in such a manner that the pressure receiving surface is rotated a first angle clockwise or counterclockwise on a vertical line from a position at which the pressure receiving surface is parallel to a line extending in a front-rear direction of the vehicle, and then the pressure receiving surface is rotated a second angle clockwise or counterclockwise on the line extending in the front-rear direction of the vehicle, at least one of the first angle and the second angle being not 0 degree.

When the pressure sensor is arranged in the side door in the above-described manner, a distortion of the pressure receiving surface of the diaphragm due to an impact force of a side collision can be reduced. Thus, the side collision detecting apparatus can detect the change in the pressure in the side door with accuracy.

BRIEF DESCRIPTION OF THE DRAWINGS

Additional objects and advantages of the present invention will be more readily apparent from the following detailed description of exemplary embodiments when taken together with the accompanying drawings. In the drawings.

DETAILED DESCRIPTION OF THE EXEMPLARY EMBODIMENTS

First Embodiment

A side collision detecting apparatus 2 according to a first embodiment of the present invention will be described with reference to FIG. 1 to FIG. 7 and FIG. 16 to FIG. 20. The side collision detecting apparatus 2 is disposed in a vehicle 1 as illustrated in FIG. 19.

Figure 7:
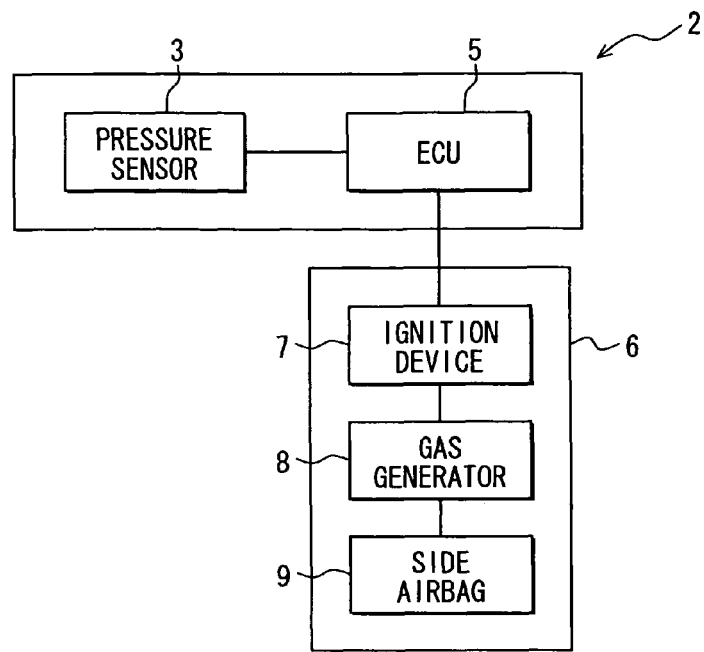
FIG. 7 is a block diagram illustrating a side impact detecting apparatus and a side airbag system.

The side collision detecting apparatus 2 includes a pressure sensor 3 for detecting a side collision of the vehicle 1. The pressure sensor 3 is disposed, for example, in each front side door 4 of the vehicle 1. When an object collides against a side surface of the vehicle 1, the side door 4 deforms, and thereby air pressure in the side door 4 changes. The pressure sensor 3 detects a change in the air pressure in the side door 4. As illustrated in FIG. 7, the pressure sensor 3 is electrically coupled with an electronic control unit (ECU) 5. The pressure sensor 3 outputs a detecting signal to the ECU 5 in accordance with a detecting pressure. The ECU 5 determines that a side collision occurs when the detecting signal from the pressure sensor 3 is higher than a threshold value. When the ECU 5 determines that the side collision occurs, the ECU 5 outputs an operating signal to a side airbag system 6.

The side airbag system 6 includes an ignition device 7, a gas generator 8, and a side airbag 9. When the ignition device 7 receives the operating signal from the ECU 5, the ignition device 7 ignites the gas generator 8. The gas generator 8 instantaneously generates large volumes of gas to fill the side airbag 9, and thereby the airbag instantaneously expands and inflates between an occupant and an inner surface of the vehicle for protecting the occupant from a secondary collision.

The side airbag 9 is provided, for example, to a driver seat and a passenger seat for protecting an occupant from a collision to a right side and a left side of the vehicle 1. The pressure sensor 3 is a semiconductor pressure sensor. The pressure sensor 3 includes a resin case 16. In the resin case 16, a sensor chip 13 and a circuit chip 14 are disposed.

Figure 6A:
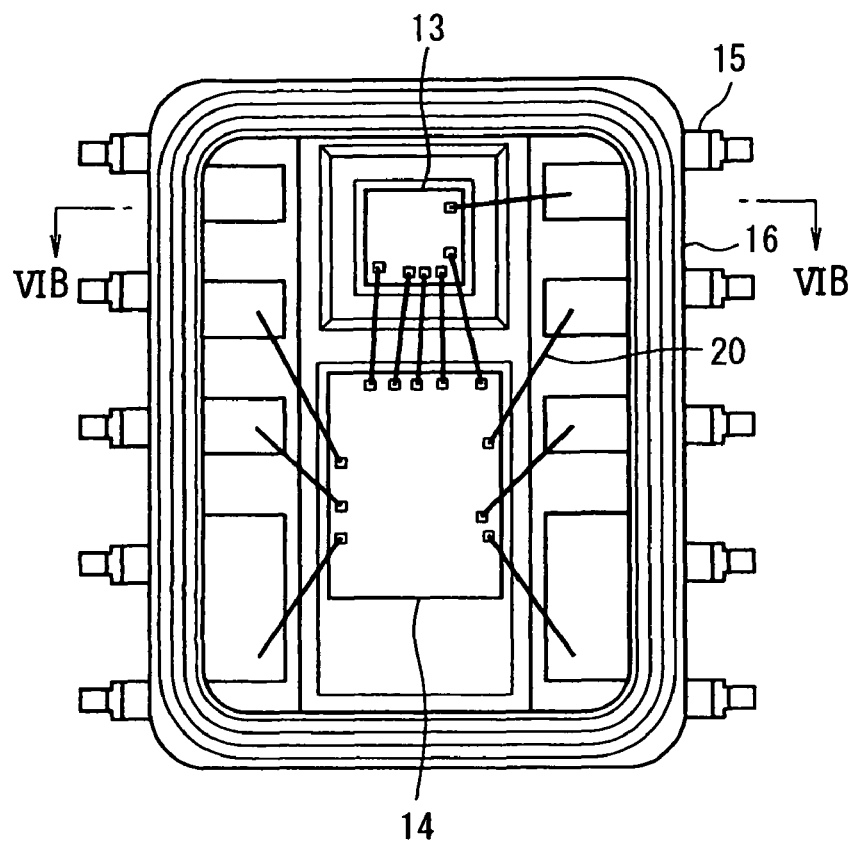
FIG. 6A is a diagram illustrating a plan view of a sensor element of the pressure sensor.
Figure 6B:
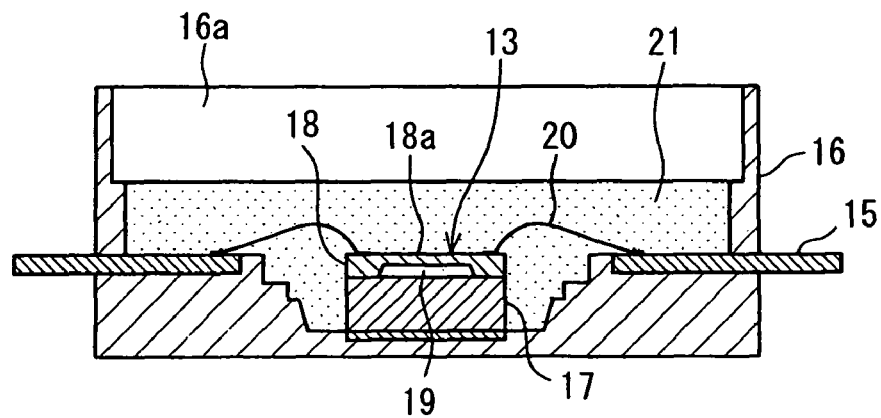
FIG. 6B is a diagram illustrating a cross-sectional view of the sensor element taken along line VIB-VIB in FIG. 6A.

As illustrated in FIG. 6B, the sensor chip 13 includes a glass pedestal 17 and a silicon diaphragm 18 joined on the glass pedestal 17. The silicon diaphragm 18 defines a reference pressure chamber 19. A lower side of the reference pressure chamber 19 is closed by the glass pedestal 17. The silicon diaphragm 18 has a pressure receiving surface 18a that closes an upper side of the reference pressure chamber 19. The pressure receiving surface 18a is distorted in accordance with a difference between a pressure in the reference pressure chamber 19 and air pressure outside the reference pressure chamber 19. In the present embodiment, the reference pressure chamber 19 is in a vacuum state.

The silicon diaphragm 18 has, for example, a piezoresistive element that is bridge-connected. The piezoresistive element can function as a detecting element. A resistance value of the piezoresistive element changes in accordance with a distortion of the silicon diaphragm 18. Thus, a pressure applied to the silicon diaphragm 18 can be detected. The circuit chip 14 includes a semiconductor element that configurates an amplifier circuit for amplifying an output signal (voltage) of the silicon diaphragm 18.

As illustrated in FIG. 6A, bonding wires 20 electrically couple terminals of the sensor chip 13 and terminals of the circuit chip 14, a terminal of the sensor chip 13 and a lead frame 15, and terminals of the circuit chip 14 and lead frames 15, respectively. In the resin case 16, a resin gel layer 21 made of soft resin is filled. The sensor chip 13, the circuit chip 14, and the bonding wires 20 are embedded in the resin gel layer 21 so as to be prevented from dewfall, corrosion, and breaking. The resin case 16 has an opening portion 16a. The resin case 16 communicates with a pressure introducing port 24a through the opening portion 16a. Due to the opening portion 16a, the air pressure in the side door 4 can be applied to the pressure receiving surface 18a in the resin case 16 through the resin gel layer 21. The sensor chip 13, the circuit chip 14, the lead frames 15, and the resin case 16 are integrated so as to configurate a sensor element 12.

Figure 3:
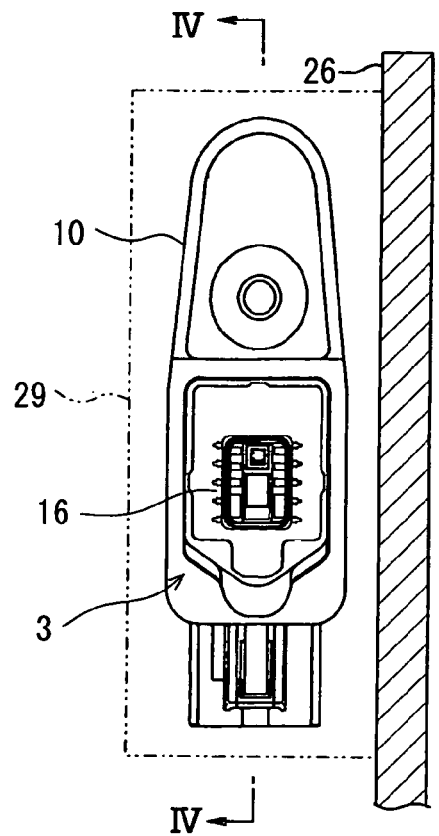
FIG. 3 is a diagram illustrating a pressure sensor according to the first embodiment.
Figure 4:
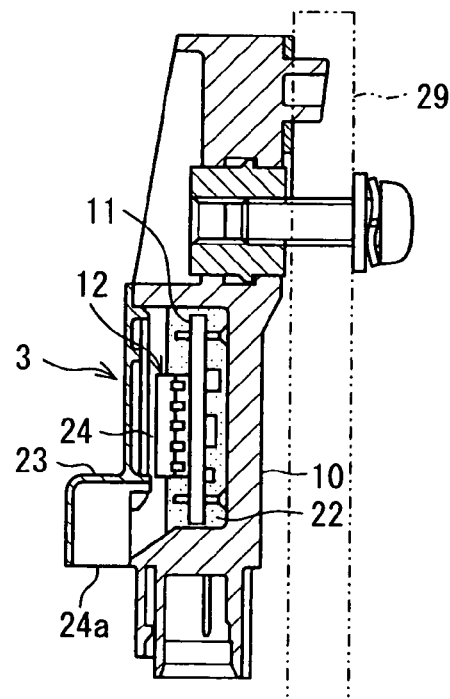
FIG. 4 is a diagram illustrating a cross-sectional view of the pressure sensor taken along line IV-IV in FIG. 3.

As illustrated in FIG. 3 and FIG. 4, the resin case 16 and various electronic parts are mounted on a circuit board 11. The circuit board 11 is embedded in a resin gel layer 22 filled in a casing 10. The casing 10 is made of resin. That is, the sensor element 12 is mounted on the circuit board 11 disposed in the casing 10. A urethane layer may be used instead of the resin gel layer 22.

The casing 10 is attached with a cap 23 so as to cover the resin case 16 including the sensor chip 13 and the circuit chip 14. The cap 23 defines an introducing passage 24 for introducing the pressure in the side door 4 to the sensor chip 13. A lower end portion of the cap 23 opens downward to an inside of the side door 4 so as to provide the pressure introducing port 24a. The casing 10 is fixed to an attaching board 29, for example, with a bolt.

Figure 1:
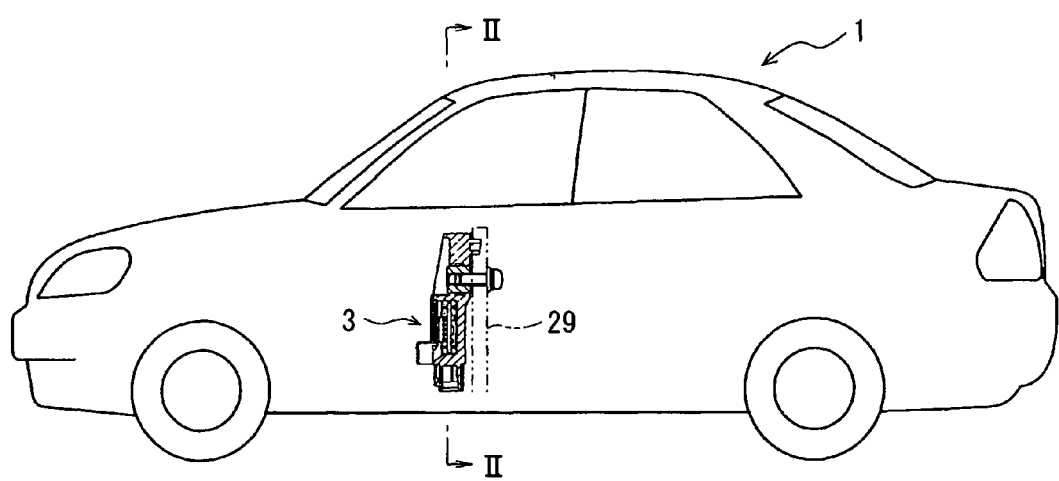
FIG. 1 is a diagram illustrating a positional relationship between a side door of a vehicle and a pressure sensor according to a first embodiment of the present invention.

An arrangement of the pressure sensor 3 in the vehicle 1 will now be described with reference to FIG. 1 and FIG. 2. The pressure sensor 3 is arranged in the side door 4 of the vehicle 1 as illustrated in FIG. 1.

Figure 2:
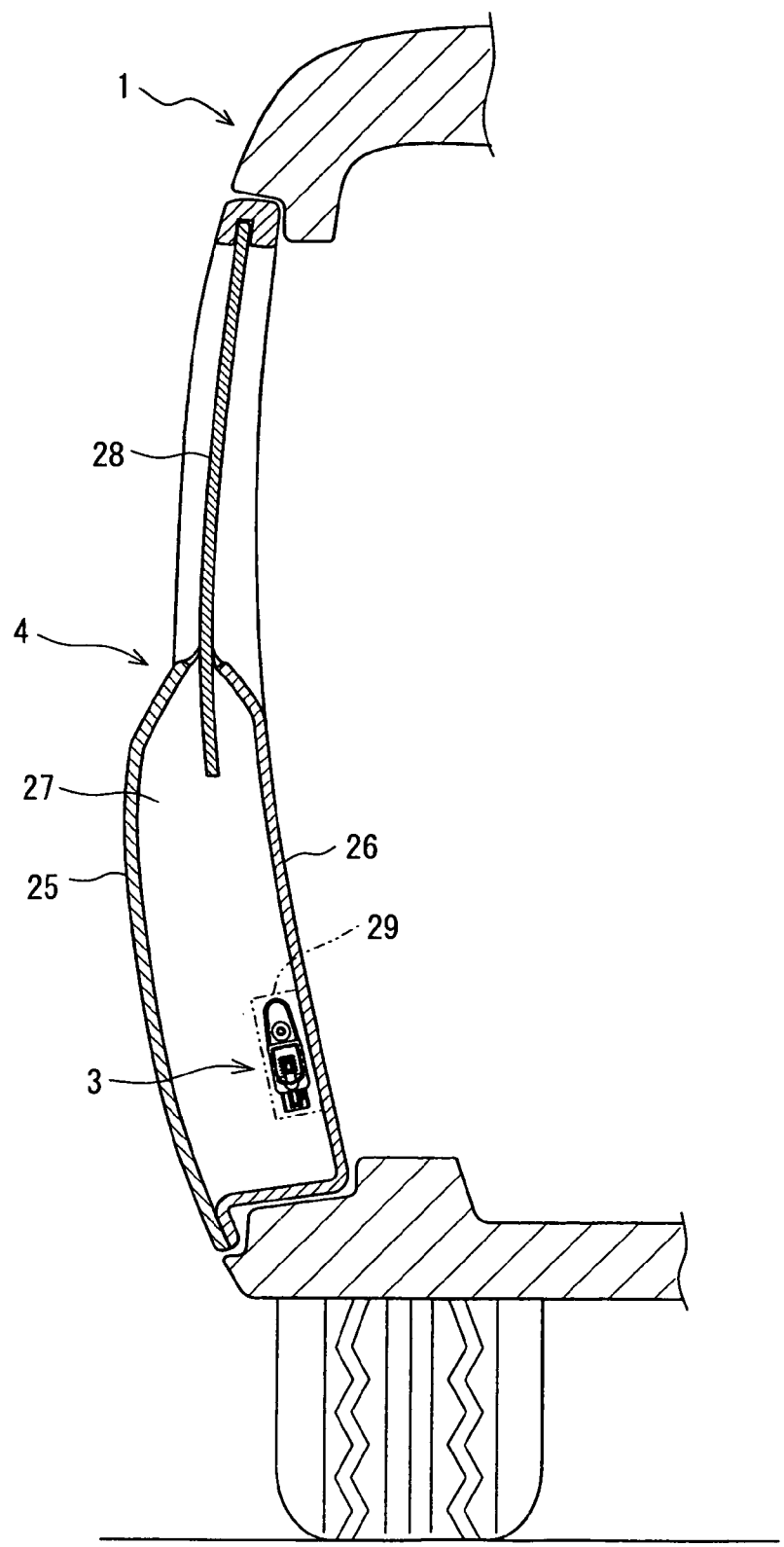
FIG. 2 is a diagram illustrating a cross-sectional view of the side door taken along line II-II in FIG. 1.

As illustrated in FIG. 2, the side door 4 includes an outer panel 25 and an inner panel 26. The outer panel 25 and the inner panel 26 are attached with each other so as to have an internal space 27 therebetween. The internal space 27 is provided so that a window glass 28 can move up and down. The attaching board 29 is fixed to the inner panel 26 and protrudes into the internal space 27. The pressure sensor 3 is disposed on the attaching board 29.

Figure 5A:
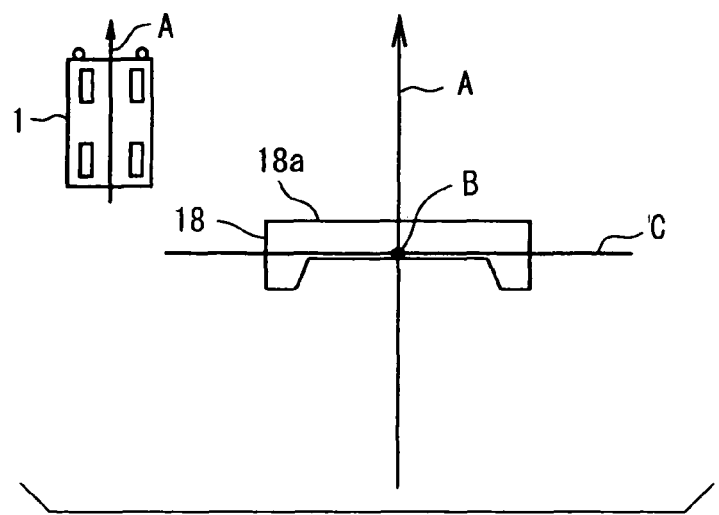
FIG. 5A is a diagram illustrating an exemplary arrangement of the pressure sensor in a case where a pressure receiving surface of a diaphragm is arranged vertically.

In an example illustrated in FIG. 5A, on an assumption that an object perpendicularly collides against the side surface of the vehicle 1, the pressure sensor 3 is disposed on the attaching board 29 in such a manner that the pressure receiving surface 18a of the silicon diaphragm 18 is arranged vertically to a ground along a C-axis that is perpendicular to a front-rear direction of the vehicle 1 so that the receiving surface 18a is not parallel to the front-rear direction. In the present embodiment, the pressure receiving surface 18a is arranged vertically to the ground. In addition, the pressure receiving surface 18a is arranged so as to cross an A-axis that extends in the front-rear direction of the vehicle 1, that is, a straight moving direction of the vehicle 1. The A-axis bisects the vehicle 1 into a right section and a left section. In other words, the pressure receiving surface 18a is not parallel to the A-axis. In the following description, a direction that is perpendicular to the A-axis and extends to the right-left direction of the vehicle 1 is expressed as the C-axis. Furthermore, a direction that extends vertically to the ground is expressed as a B-axis.

When an object collides against the side door 4 of the vehicle 1 and the side door 4 deforms, the pressure in the side door 4 increases. Due to the increase of the pressure in the side door 4, the pressure receiving surface 18a of the silicon diaphragm 18 of the pressure sensor 3 is distorted in a direction perpendicular to an extending direction of the pressure receiving surface 18a (hereafter distortion direction). The pressure sensor 3 outputs the detecting signal to the ECU 5 in accordance with a distortion of the pressure receiving surface 18a of the silicon diaphragm 18. If the detecting signal from the pressure sensor 3 exceeds the threshold value, the ECU 5 outputs the operating signal to the ignition device 7. The ignition device 7 ignites the gas generator 8 and the side airbag 9 instantaneously inflates for protecting an occupant.

When an object collides perpendicularly against the vehicle 1 along the C-axis, not all impact force due to the collision acts in the distortion direction of the pressure receiving surface 18a because the pressure receiving surface 18a is arranged along a colliding direction, that is, the C-axis in which the impact force acts although the pressure receiving surface 18a is arranged vertically to the ground. When an object collides from a direction shifted a few degrees from the C-axis, the impact force acting to the pressure receiving surface 18a is reduced as a component force. Thus, the impact force due to the side collision has a small influence to the distortion of the pressure receiving surface 18a.

Figure 16:
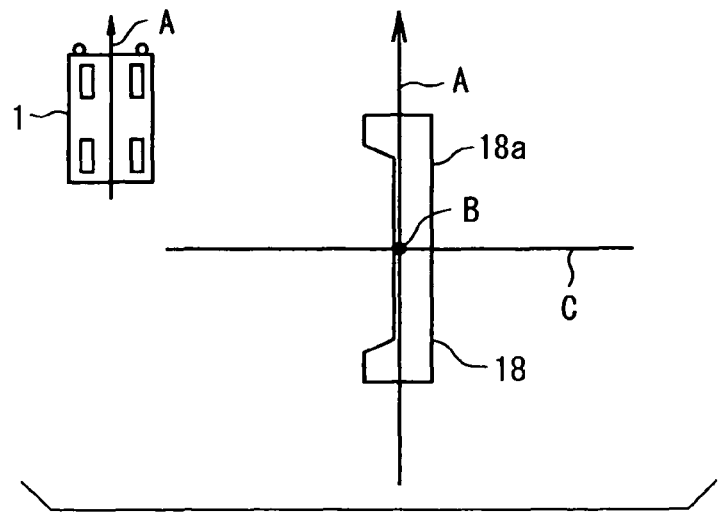
FIG. 16 is a diagram illustrating an arrangement of a pressure receiving surface according to a first comparative example.

As a comparative example, the conventional arrangement of the pressure receiving surface 18a will be described below. In a first comparative example illustrated in FIG. 16, the pressure receiving surface 18a is arranged vertically to the ground along a direction parallel to the A-axis. If the object collides from the C-axis direction, the pressure receiving surface 18a is applied with the impact force of the collision, and thereby a collision component may be detected by error. When the resin gel layer 21 covering the silicon diaphragm 18 receives the impact force and the impact force is perpendicular to the extending direction of the pressure receiving surface 18a as illustrated in FIG. 16, the resin gel layer 21 applies a force to the pressure receiving surface 18a in accordance with the impact force and distorts the pressure receiving surface 18a. Since the pressure receiving surface 18a has a mass, the pressure receiving surface 18a is distorted by receiving the force in accordance with the impact force. In such a case, the pressure sensor 3 is difficult to detect a change in the pressure in the side door 4 with accuracy.

However, in the example illustrated in FIG. 5A, the pressure receiving surface 18a of the silicon diaphragm 18 is arranged along the C-axis. Thus, the resin gel layer 21 is restricted from applying force to the pressure receiving surface 18a due to the impact force from the C-axis direction, and the pressure receiving surface 18a is restricted from being distorted excessively due to the impact force. Therefore, the pressure sensor 3 can detect a change in the pressure in the side door 4 with accuracy.

A preferable arrangement of the pressure receiving surface 18a will be described with reference to FIG. 5B and FIG. 5C. The pressure sensor 3 is arranged in such a manner that the pressure receiving surface 18a is rotated a predetermined angle θ from the C-axis on the B-axis. In a case where the pressure sensor 3 is disposed in a right front door, the predetermined angle θ is less than or equal to 30 degrees in a counterclockwise direction. In a case where the pressure sensor 3 is disposed in a left front door, the predetermined angle θ is less than or equal to 30 degrees in a clockwise direction. That is, the predetermined angle θ expresses an angle between the C-axis and the extending direction of the pressure receiving surface 18a. When the distortion direction of the pressure receiving surface 18a is expressed by the arrow P, the arrow P is perpendicular to the pressure receiving surface 18a and the arrow P crosses the A-axis at the predetermined angle θ. An angle between the A-axis and extending direction of the pressure receiving surface 18a can be expressed as (90−θ) degrees. A preferable range of the angle between the A-axis and extending direction of the pressure receiving surface 18a is from 60 degrees to 90 degrees as illustrated in FIG. 5C. That is, a preferable range of the predetermined angle θ is from 0 degree to 30 degrees. The most preferable angle between the A-axis and extending direction of the pressure receiving surface 18a is 75 degrees. That is, the most preferable angle of the predetermined angle θ is 15 degrees.

Figure 5B:
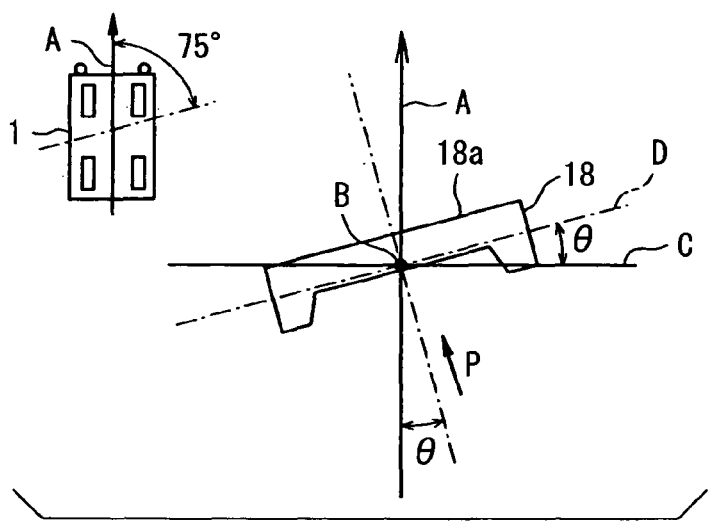
FIG. 5B is a diagram illustrating an arrangement of the pressure receiving surface in a case where a angle between a line along which the pressure receiving surface extends and a horizontal line extending in a front-rear direction of the vehicle is 75 degrees.
Figure 5C:
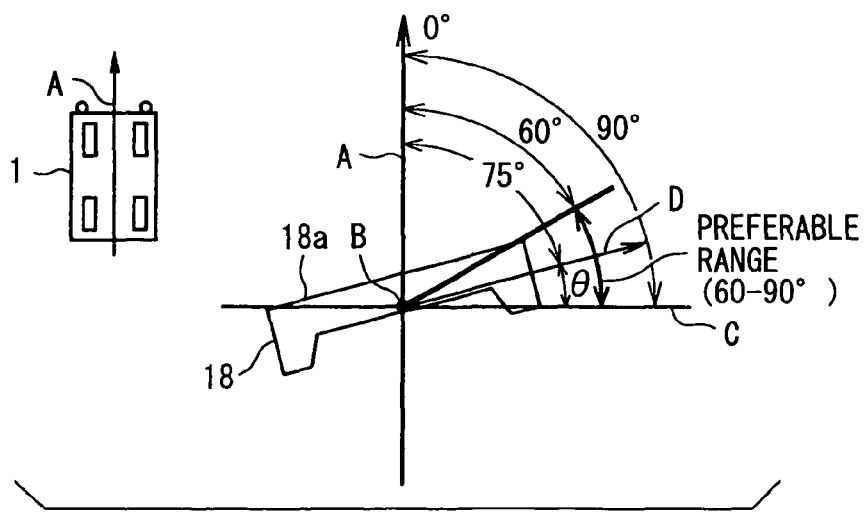
FIG. 5C is a diagram illustrating a preferable range of the arrangement of the pressure receiving surface.

In FIG. 5A to FIG. 5C, the pressure receiving surface 18a faces toward the front side of the vehicle 1, as an example. Alternatively, the pressure receiving surface 18a may face toward the rear side of the vehicle 1.

Figure 20:
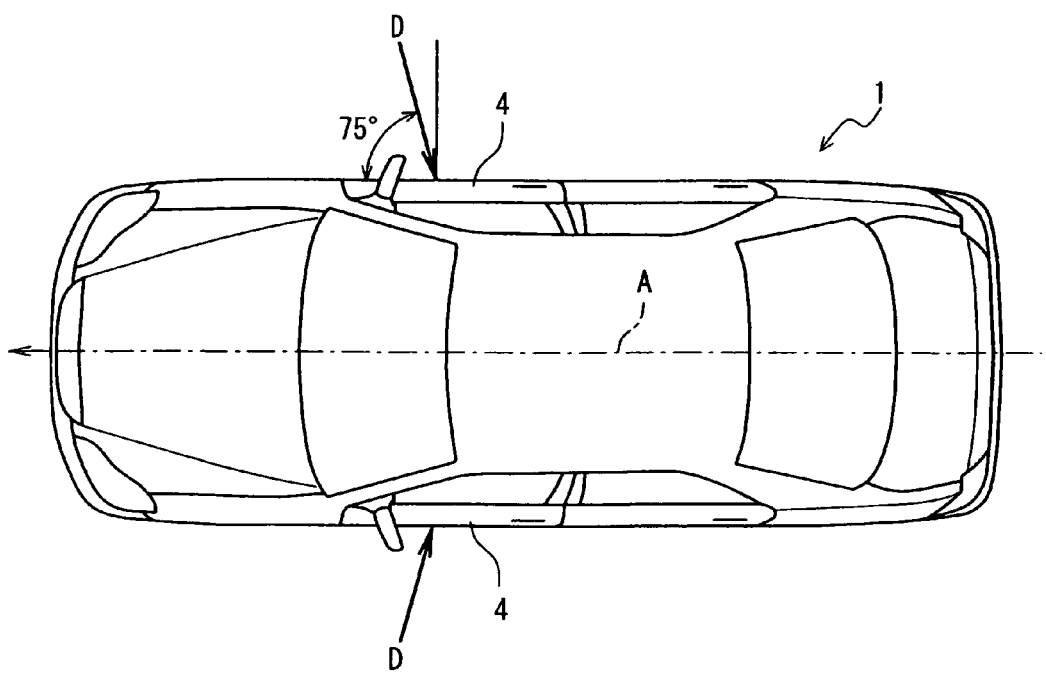
FIG. 20 is a diagram illustrating the most frequent collision angle of a side collision.

The reason why the most preferable angle of the predetermined angle θ is 15 degrees will be described with reference to FIG. 20. In an actual side collision, an object collides obliquely against the side surface of the vehicle 1 from a right front or a left front of the vehicle 1 as illustrated by the arrow D rather than collides perpendicularly. According to statistics of past side collision accidents, the most frequent collision angle is 75 degrees, which corresponds to the predetermined angle of 15 degrees. Also in a side impact test under a condition of Federal Motor Vehicle Safety Standards 214 (FMVSS 214), a pole is collided against a vehicle from a right front and a left front at an angle of 75 degrees.

Thus, the pressure receiving surface 18a of the pressure sensor 3 disposed in the right side door 4 and the pressure receiving surface 18a of the pressure sensor 3 disposed in the left side door 4 are preferred to be arranged in such a manner that the predetermined angle θ is 15 degrees and the angle between the A-axis and the extending direction of the pressure receiving surface 18a is 75 degrees as illustrated in FIG. 5B. The pressure sensor 3 disposed in the right side door 4 and the pressure sensor 3 disposed in the left side door 4 are arranged symmetrically. In the following description, only the pressure sensor 3 disposed in the right side door 4 will be described and a description of the pressure sensor 3 disposed in the left side door 4 will be omitted.

In the present embodiment, the pressure receiving surface 18a of the silicon diaphragm 18 is arranged vertically to the ground in such a manner that extending direction of the pressure receiving surface 18a is not perpendicular to the D-axis. The D-axis crosses the A-axis from the right front at an angle of 75 degrees, that is, the predetermined angle θ of the D-axis is 15 degrees. In the example illustrated in FIG. 5B, the pressure sensor 3 is disposed in the right side door 4 in such a manner that the pressure receiving surface 18a of the silicon diaphragm 18 is arranged in parallel with the B-axis and the extending direction of the pressure receiving surface 18a is parallel to the D-axis.

Figure 17:
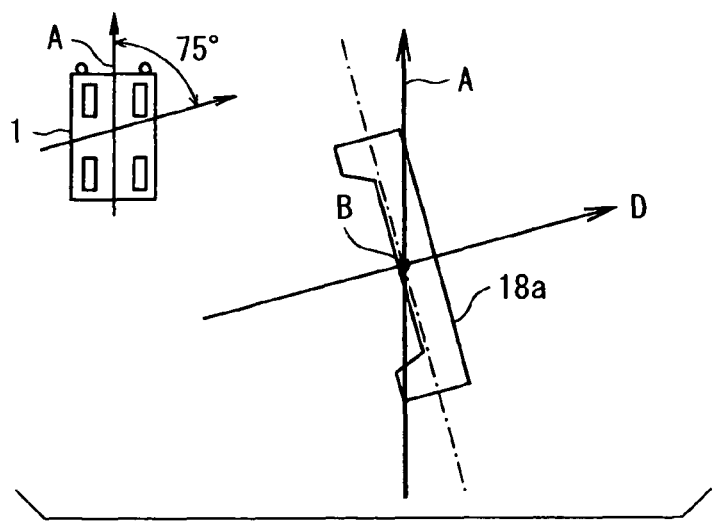
FIG. 17 is a diagram illustrating an arrangement of a pressure receiving surface according to a second comparative example.

In a second comparative example illustrated in FIG. 17, the pressure receiving surface 18a is arranged vertically to the ground and is arranged along a line that crosses the A-axis at an angle of 75+90 degrees from the right front. In such a case, the pressure receiving surface 18a is most likely to be distorted due to an impact force of a collision from the right front at an angle of 75 degrees.

When the pressure sensor 3 is arranged vertically to the ground in such a manner that the predetermined angle θ is 15 degrees, as illustrated in FIG. 5B, an impact force of a collision from the D-axis direction acts to the pressure receiving surface 18a in a direction perpendicular to a distortion direction of the pressure receiving surface 18a. Thus, at least in principle, the pressure receiving surface 18a is not distorted due to the impact force. Therefore, the most preferable predetermined angle θ is 15 degrees. Also in a case where the predetermined angle θ is in a range from 0 degree to 30 degrees, a distortion of the pressure receiving surface 18a due to an impact force of a collision from a right front at an angle of 75 degrees can be reduced.

The pressure receiving surface 18a may be arranged along the D-axis having the predetermined angle θ of 15 degrees and may be rotated on the D-axis. Also in such a case, the above-described effect can be obtained. As illustrated in FIG. 5C, the predetermined angle θ is preferred to be ±15 degrees from the D-axis. That is, the preferable range of the predetermined angle θ is 0 degree to 30 degrees. Thus, the preferable range of the angle between the A-axis and extending direction of the pressure receiving surface 18a is from 60 degrees to 90 degrees. When an collision angle of a side impact test of the side collision detecting apparatus 2 is changed, that is, when the most frequent collision angle according to statistics of past side collision accidents is changed, the predetermined angle θ may be changed.

Second Embodiment

A side collision detecting apparatus 2 according to a second embodiment of the present invention will be described with reference to FIG. 8 to FIG. 12.

Figure 8:
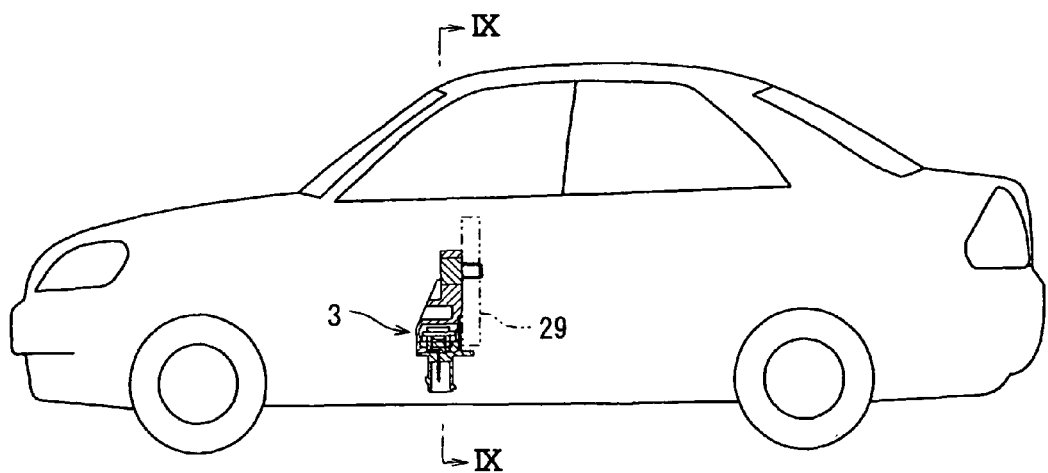
FIG. 8 is a diagram illustrating a positional relationship between a side door of a vehicle and a pressure sensor according to a second embodiment of the present invention.
Figure 9:
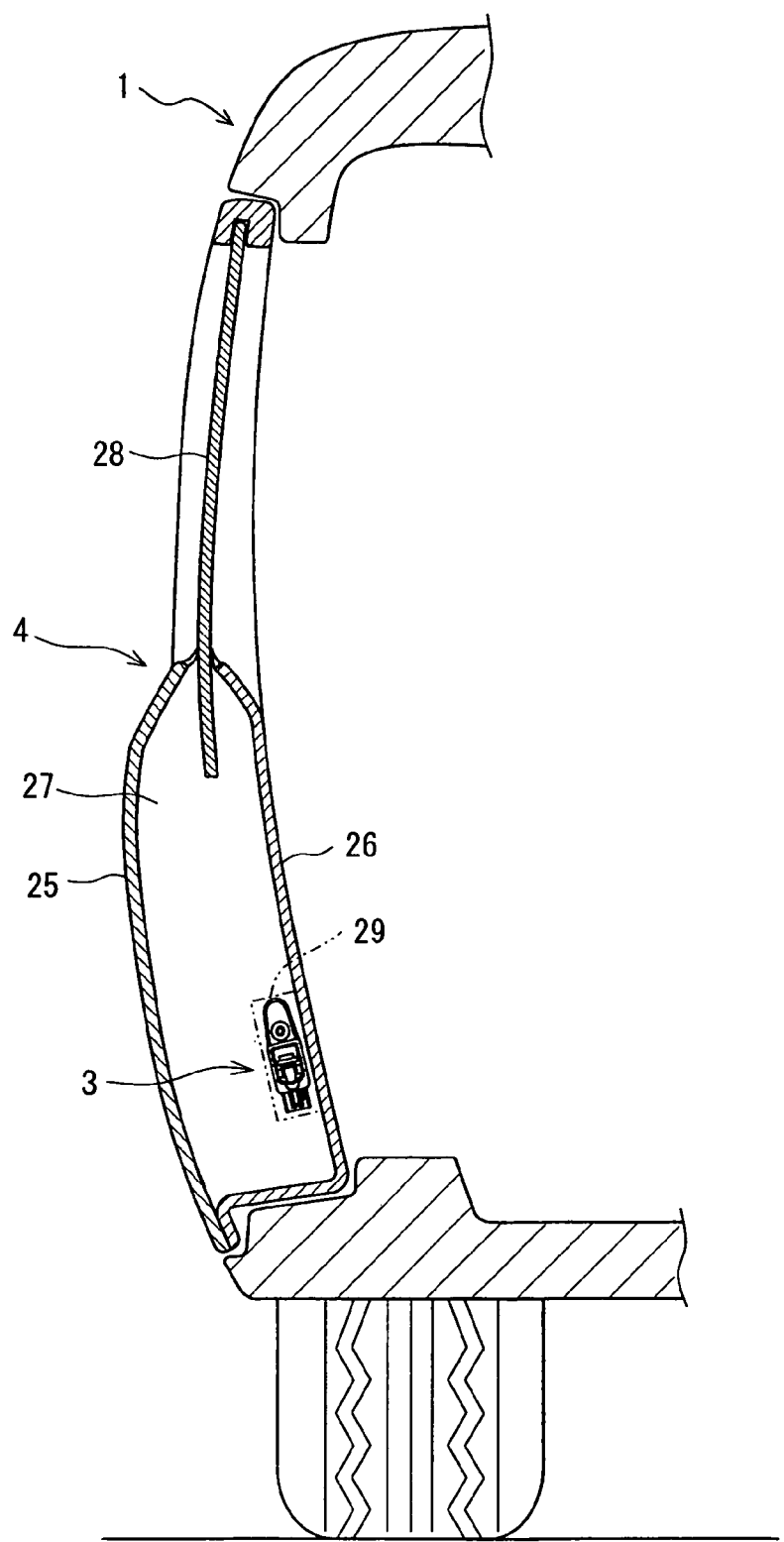
FIG. 9 is a diagram illustrating a cross-sectional view of the side door taken along line IX-IX in FIG. 8.

As illustrated in FIG. 8 and FIG. 9, in the present embodiment, the pressure sensor 3 is arranged in such a manner that the pressure receiving surface 18a is parallel to the A-axis extending in the front-rear direction of the vehicle 1 and is not parallel to the B-axis extending in the vertical direction to the ground. That is, the sensor chip 13 and the pressure receiving surface 18a are inclined from the B-axis at a predetermined angle φ from −45 degrees to 45 degrees. In addition, in the present embodiment, the pressure introducing port 24a opens toward the ground, for example.

Figure 10:
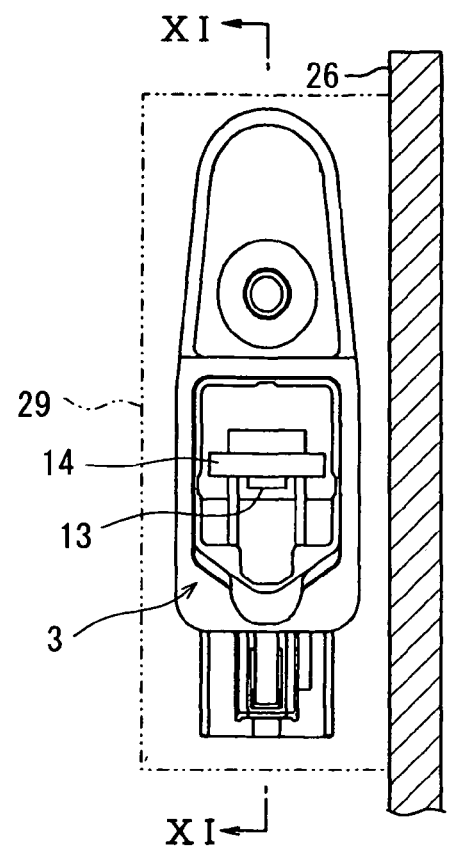
FIG. 10 is a diagram illustrating a pressure sensor according to the second embodiment.
Figure 11:
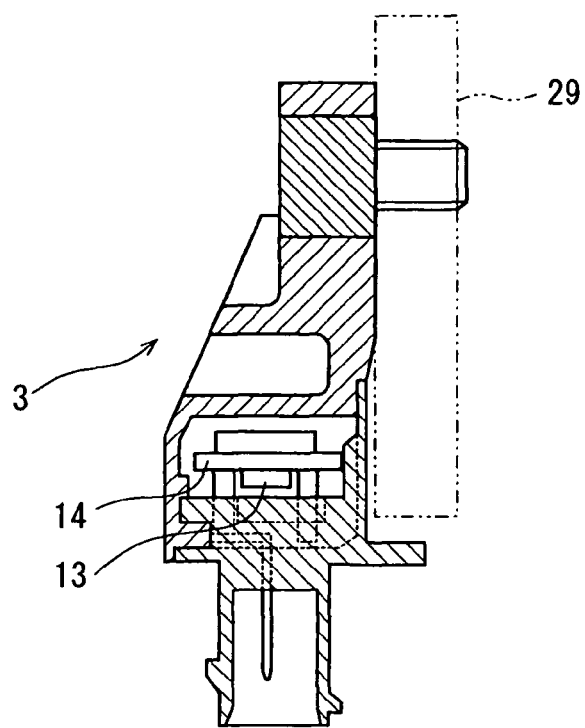
FIG. 11 is a diagram illustrating a cross-sectional view of the pressure sensor taken along line XI-XI in FIG. 10.

A configuration of the pressure sensor 3 according to the present embodiment will be described with reference to FIG. 10 and FIG. 11. The sensor element 12 including the sensor chip 13 is arranged in the horizontal direction. The pressure receiving surface 18a of the silicon diaphragm 18 extends in the horizontal direction along the C-axis.

Figure 18:
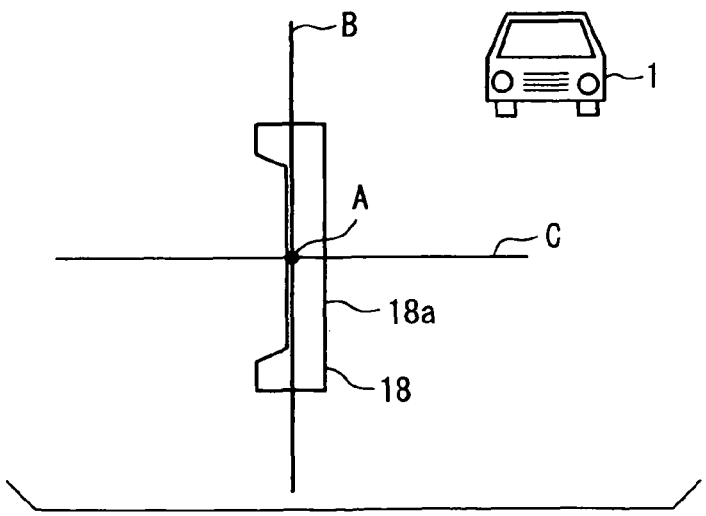
FIG. 18 is a diagram illustrating an arrangement of a pressure receiving surface according to a third comparative example.
Figure 19:
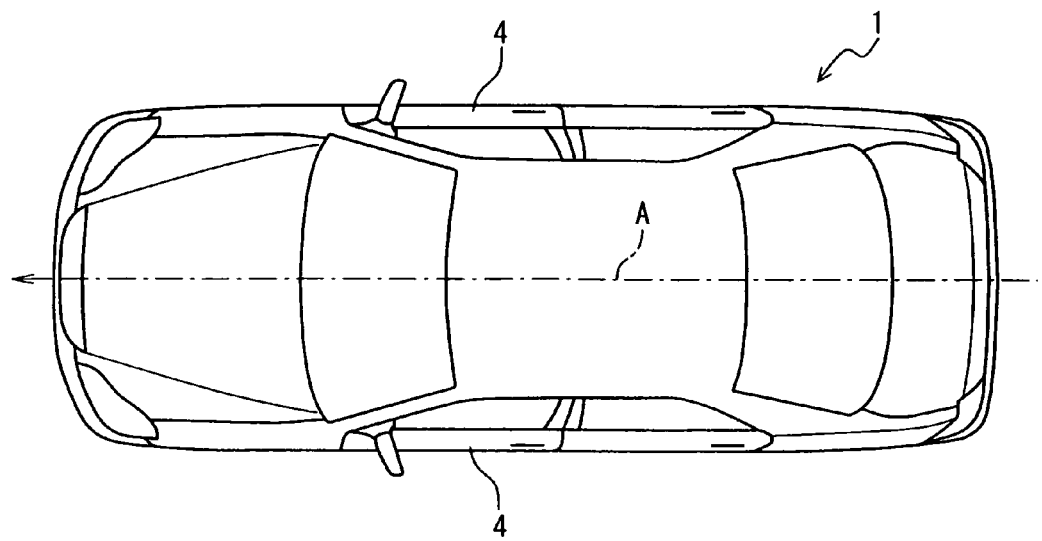
FIG. 19 is a diagram illustrating a plan view of a vehicle.

In a third comparative example illustrated in FIG. 18, the pressure sensor 3 is arranged in such a manner that the pressure receiving surface 18a is parallel to the A-axis and the B-axis. In such a case, when an object perpendicularly collides against the side surface the vehicle 1 along the C-axis, an impact force of the side collision may be applied to the pressure receiving surface 18a, and thereby an impact component may be detected by error.

Figure 12A:
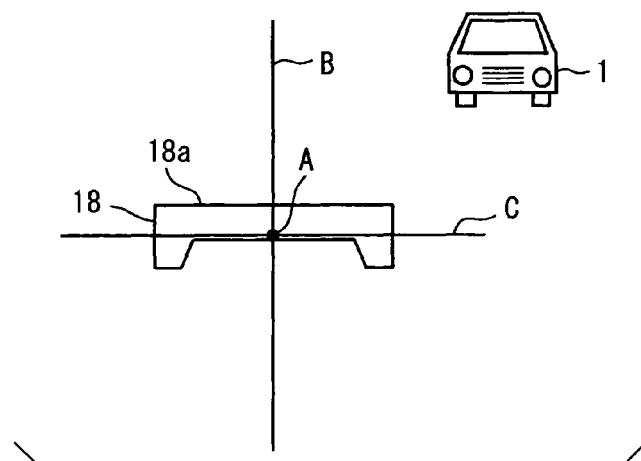
FIG. 12A is a diagram illustrating an exemplary arrangement of the pressure sensor in a case where a pressure receiving surface of a diaphragm is arranged horizontally.
Figure 12B:
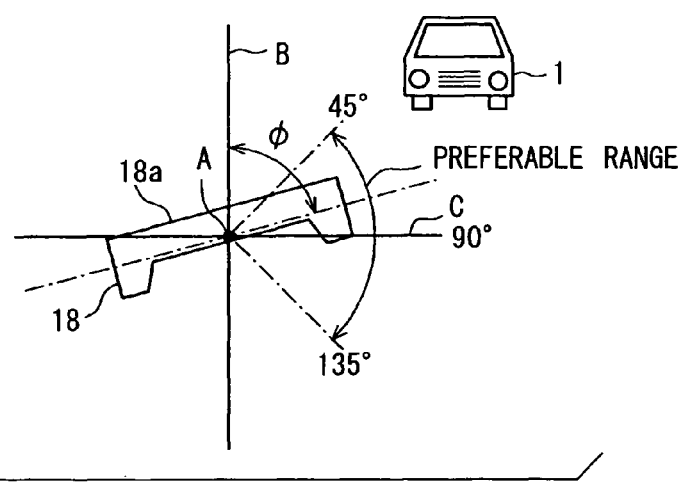
FIG. 12B is a diagram illustrating a preferable range of the arrangement of the pressure receiving surface.

In the present embodiment, as illustrated in FIG. 12A, the pressure sensor 3 may be arranged in such a manner that the pressure receiving surface 18a is horizontal, that is, the pressure receiving surface 18a is perpendicular to the B-axis. Alternatively, the pressure receiving surface 18a may be rotated on the A-axis from a state illustrated in FIG. 12A from −45 degrees to 45 degrees in a counterclockwise direction so that the predetermined angle φ is 45 degrees to 135 degrees. In such a case, an impact force applied to the pressure receiving surface 18a in the distortion direction due to an impact force of a side collision from a direction perpendicular to the vehicle 1 and parallel to the ground is less than 50%. Thus, the pressure receiving surface 18a is restricted from being distorted excessively due to the impact force.

Especially, when the predetermined angle φ is 90 degrees as illustrated in FIG. 12A, that is, when the pressure receiving surface 18a is horizontal, an impact force of a collision from a horizontal direction acts to the pressure receiving surface 18a in a direction perpendicular to the distortion direction of the pressure receiving surface 18a. Thus, at least in principle, the pressure receiving surface 18a is not distorted due to the impact force. Thus, the most preferable predetermined angle φ is 90 degrees.

In the present embodiment, the pressure receiving surface 18a may face upward or downward. When the pressure receiving surface 18a is inclined from the B-axis at the predetermined angle φ, an impact force of a side collision that acts to the pressure receiving surface 18a in the distortion direction can be effectively restricted even if an object collides against the side surface of the vehicle 1 in any direction. If the pressure receiving surface 18a faces downward and the pressure introducing port 24a opens downward with respect to the pressure receiving surface 18a, foreign material and water droplet in the introducing passage 24 may be discharged from the pressure introducing port 24a due to the gravity.

If the pressure introducing port 24a opens upward, the resin gel layer 21 can be prevented from falling even when a hardness of the resin gel layer is low. When the predetermined angle φ is adjusted, the casing 10 of the pressure sensor 3 may be inclined or the silicon diaphragm 18 may be arranged obliquely in the casing 10 so that the pressure receiving surface 18a is inclined.

Third Embodiment

Figure 13:
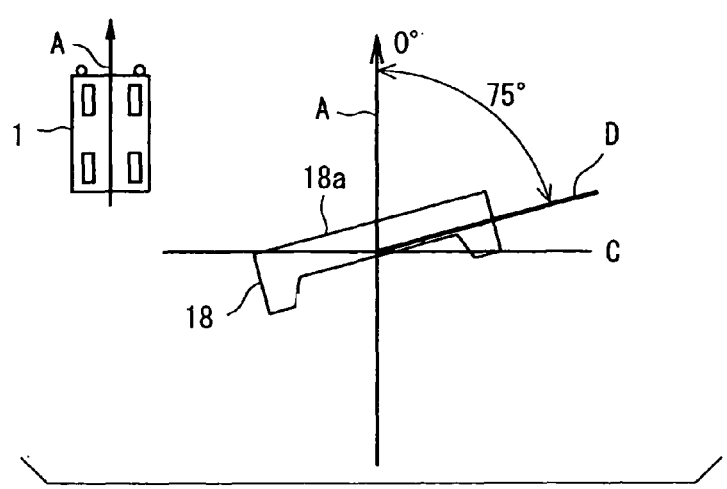
FIG. 13 is a diagram illustrating an exemplary arrangement of a pressure receiving surface of a pressure sensor according to a third embodiment of the present invention.

A side collision detecting apparatus 2 according to a third embodiment of the present invention will be described with reference to FIG. 13 and FIG. 14. As illustrated in FIG. 13, the pressure receiving surface 18a of the silicon diaphragm 18 is arranged along the D-axis. The D-axis is horizontal and is inclined at 75 degrees from the A-axis extending in the front-rear direction. As illustrated in FIG. 14B, an angle γ between the extending direction of the pressure receiving surface 18a and the B-axis is from 45 degrees to 135 degrees in the horizontal direction. That is, an offset of the pressure receiving surface 18a of the diaphragm 18 with respect to the horizontal line inclined at 75 degrees from a line extending in the front-rear direction of the vehicle is within 45 degrees.

Figure 14A:
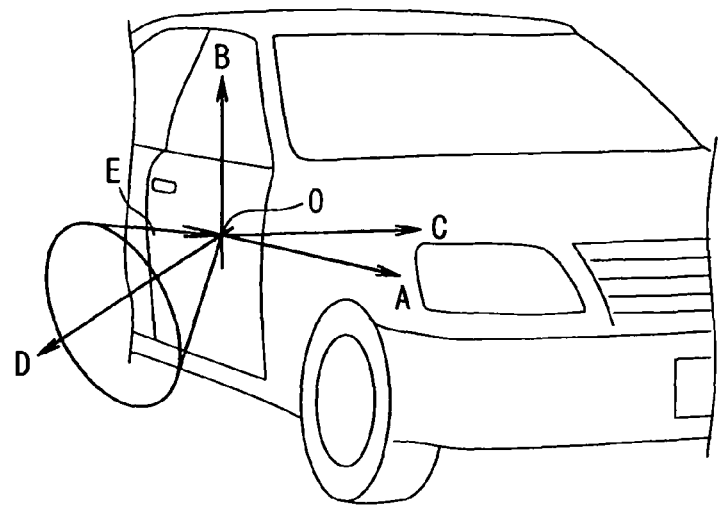
FIG. 14A is a diagram illustrating a perspective view of a vehicle.
Figure 14B:
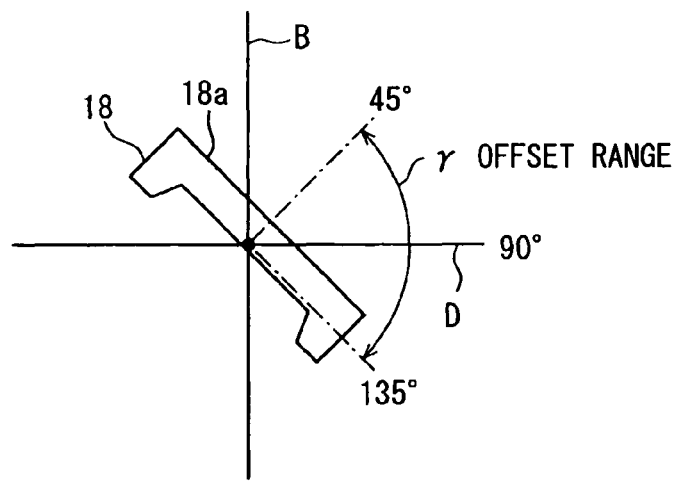
FIG. 14B is a diagram illustrating an offset range of the pressure receiving surface.

In other words, when a cone E having an axis (height) on the D-axis, having an apex O at an intersection point of the D-axis and the vehicle 1, and having an apex angle of 45 degrees is defined, as illustrated in FIG. 14A, the diaphragm 18 is arranged in such a manner that any line passing in the cone E through the apex O does not correspond to the distortion direction of the pressure receiving surface 18a.

In such a case, even when an object collides against a portion of the vehicle 1 in the D-axis direction and a height of a collided portion is different from a height of the pressure receiving surface 18a, an impact force of the collision applied to the pressure receiving surface 18a in the perpendicular direction is less than 50%. Thus, the side collision detecting apparatus 2 can detect a change in the pressure in the side door 4 with accuracy.

Other Embodiments

Although the present invention has been fully described in connection with the exemplary embodiments thereof with reference to the accompanying drawings, it is to be noted that various changes and modifications will become apparent to those skilled in the art.

Figure 15:
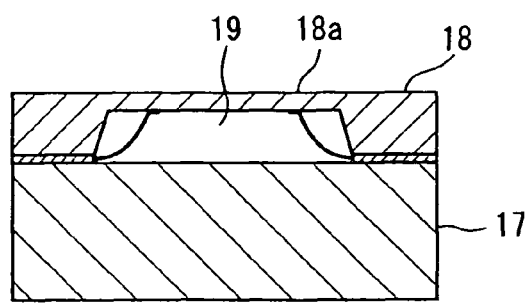
FIG. 15 is a diagram illustrating a cross-sectional view of a sensor chip according to a modification.

For example, the pressure sensor 3 may be arranged in the side door 4 in such a manner that the pressure receiving surface 18a of the silicon diaphragm 18 is horizontal. A metal diaphragm made of, for example, phosphor bronze or nickel copper alloy and including a distortion gage may also be used instead of the silicon diaphragm 18. Alternatively, as illustrated in FIG. 15, the bonding wires 20 of the sensor chip 13 may be located in the reference pressure chamber 19 on the glass pedestal 17. In such a case, the bonding wires 20 are not corroded. Thus, the resin gel layer 21 on the sensor chip 13 can be omitted.

The reference pressure chamber 19 may be communicated with an outside of the silicon diaphragm 18 and a pressure in the reference pressure chamber 19 may be set to be the air pressure. In a side impact test of the side collision detecting apparatus 2, a collision angle is changed from 75 degrees from a right front and a left front to other angle such as, for example, 80 degrees from a right front and a left front, the angle between the D-axis and the A-axis may be changed into 80 degrees. In the above-described embodiment, the horizontal direction means a direction parallel to a plane that connects points where a wheel of the vehicle 1 contacts. Thus, if the vehicle 1 is located on an inclined plane, a direction parallel to the inclined plane is the horizontal direction.

What is claimed is:

1. A side collision detecting apparatus for detecting an impact applied to a side surface of a vehicle, the side collision detecting apparatus comprising:
   a pressure sensor disposed in a side door of the vehicle and including a diaphragm configured to detect a pressure in the side door, the diaphragm having a pressure receiving surface configured to be distorted in accordance with a change in the pressure in the side door, the pressure sensor arranged in such a manner that an angle between a horizontal line along which the pressure receiving surface extends and a horizontal line extending in a front-rear direction of the vehicle is from 60 degrees to 90 degrees and a plane of the pressure receiving surface is arranged vertically perpendicular to a horizontal plane.

2. The side collision detecting apparatus according to claim 1, wherein
   the angle between the horizontal line along which the pressure receiving surface extends and the horizontal line extending in the front-rear direction of the vehicle is 75 degrees.

3. The side collision detecting apparatus according to claim 1, wherein:
   the pressure sensor further includes a pressure introducing passage configured to introduce the pressure in the side door to the pressure receiving surface; and
   the pressure introducing passage opens downward in the side door.

4. The side collision detecting apparatus according to claim 1, wherein the plane of the pressure receiving surface faces generally toward a front side or a rear side of the vehicle.

5. The side collision detecting apparatus according to claim 1, wherein the diaphragm includes a piezoresistive element that is bridge-connected.

6. The side collision detecting apparatus according to claim 1, wherein the angle between the horizontal line along which the pressure receiving surface extends and the horizontal line extending in the front-rear direction of the vehicle is taken when the side door of the vehicle is closed.

* * * * *